(12) United States Patent
Balko et al.

(10) Patent No.: US 8,762,933 B2
(45) Date of Patent: Jun. 24, 2014

(54) CONVERTING BUSINESS PROCESS MODELS TO COMPONENT MODELS IN A SERVICE ORIENTED ARCHITECTURE DOMAIN

(75) Inventors: Soeren Balko, Weinheim (DE); Boris Klinker, Karlsruhe (DE)

(73) Assignee: SAP AG, Walldorf (DE)

( * ) Notice: Subject to any disclaimer, the term of this patent is extended or adjusted under 35 U.S.C. 154(b) by 488 days.

(21) Appl. No.: 12/887,987

(22) Filed: Sep. 22, 2010

(65) Prior Publication Data

US 2012/0072884 A1    Mar. 22, 2012

(51) Int. Cl.
  *G06F 9/44*    (2006.01)
(52) U.S. Cl.
  USPC .......................................... 717/104; 717/105
(58) Field of Classification Search
  USPC .................................. 717/104, 105
  See application file for complete search history.

(56) References Cited

U.S. PATENT DOCUMENTS

2009/0158240 A1 *  6/2009  Zhang et al. ................. 717/104

OTHER PUBLICATIONS

Client and Implementation Specification for Client and Implementation Model Specification for WS-BPEL, SCA Version 1.00, Mar. 21 2007.

* cited by examiner

*Primary Examiner* — Qamrun Nahar
(74) *Attorney, Agent, or Firm* — Kenyon & Kenyon LLP

(57) ABSTRACT

Process artifacts and elements in a business process model, such as a Business Process Modeling Notation (BPMN) compliant model, may be analyzed, converted into component model building blocks for developing applications, and enriched with technical metadata. The component model building blocks may be Service Component Architecture (SCA) Assembly Model building blocks, which may include artifacts, components, composites, and other elements. The building blocks may be structured in an output file, which may be a Simple Capabilities Description Language (SCDL) file, according to the Service Component Architecture (SCA) Assembly Model based on an order provided in the business process model. Business process model elements may be mapped to corresponding component model building blocks, such as SCA artifacts, composites, or components, through a lookup table or database.

19 Claims, 6 Drawing Sheets

FIG. 3A

| Mapping Table 300 | |
|---|---|
| BPMN: Project 301 | SCA: Contribution 302 |
| BPMN: Collaboration 303 | SCA: Composite 304 |
| BPMN: Pool 305 | SCA: Component 306 |
| BPMN: Catch Event 307 | SCA: Service 308 |
| BPMN: Throw Event 309 | SCA: Reference 310 |
| BPMN: Event Definition 311 | SCA: Binding/Implementation Type 312 |
| BPMN: Start Event/End Event 313 | SCA: Synchronous Service 314 |
| BPMN: Intermediate Event 315 | SCA: Asynchronous Reference 316 |
| BPMN: Boundary Event 317 | SCA: Asynchronous Reference 318 |
| BPMN: Activity 319 | SCA: Reference 320 |
| BPMN: Message Flow 321 | SCA: Wire 322 |

FIG. 3B

| Mapping Table 330 | |
|---|---|
| BPMN: Message Start Event 331 | SCA: Service (Synchronous or Asynchronous) 332 |
| BPMN: Message Intermediate Catch Event 333 | SCA: Asynchronous Service 334 |
| BPMN: Receive Task 335 | SCA: Asynchronous Service 336 |
| BPMN: Message End Event 337 | SCA: Asynchronous Reference or Synchronous Service 338 |
| BPMN: Message Intermediate Throw Event 339 | SCA: Asynchronous Reference 340 |
| BPMN: Send Task 341 | SCA: Asynchronous Reference 342 |
| BPMN: Sub-Process 343 | SCA: Asynchronous Reference for Invocation and Service for Completion/Cancellation 344 |
| BPMN: User Task 345 | SCA: Asynchronous Reference for Invocation and Service for Completion/Cancellation 346 |
| BPMN: Service Task 347 | SCA: Synchronous Reference 348 |
| BPMN: Process 349 | SCA: Component 350 |
| BPMN: Collaboration 351 | SCA: Composite 352 |

CONVERTING BUSINESS PROCESS MODELS TO COMPONENT MODELS IN A SERVICE ORIENTED ARCHITECTURE DOMAIN

BACKGROUND

Organizations rely on computing systems and applications to perform different business processes. For example, inventory control systems may be used to manage and track product distribution and task management systems may track progress to a goal. Although organizations often obtain different systems from different manufacturers, they nonetheless expect the different systems to interact with each other.

This is especially true when organizations develop new applications or functionality in existing applications to support new business processes. Aside from expecting interactivity between systems, organizations also seek to minimize costs when developing these new applications or functionalities. One way of minimizing development costs is to use business process modeling software to enable business analysts and those familiar with the organization's business processes to model those processes. However, development costs are not fully minimized because an experienced computer programmer may still be needed to convert the modeled processes into application code.

Business Process Modeling Notation (BPMN) may be used to graphically represent and model business processes. BPMN uses standardized symbols and flowcharts to visually describe processes intuitively to business users while also incorporating complex functions and semantics for technical users. This functionality makes BPMN useful to both business and technical users.

FIG. 1 shows an exemplary business process model 100 based on the BPMN specification. The model includes a pool 110 that may be subdivided into one or more lanes 120. A pool 110 may represent an entity involved in a process. An entity may include a technical system, business partner, corporate subsidiary, branch, or other division of systems or organizations. If multiple entities are involved in completing a process, then multiple pools may be included in the model. Each pool 110 may contain one or more lanes 120. A lane 120 may be used to organize and separate different functions or roles within an entity. Lanes may contain flow objects, connecting objects, and artifacts. Flow objects may include events 121, 123, 125, activities, or tasks 124. Connecting objects may include sequence flows 122 and message flows 131. Artifacts may include data objects 132.

An event 121, 123, 125 represents a synchronization between a business process and an external environment, which may occur by sending or receiving an event to a component of the external environment. An activity or task 124 represent something is performed. A start event 121 triggers the start of a process and is also known as a Catch Event because it may receive or "catch" an incoming message to begin the process. Intermediate events 123 represent actions, such as catch or throw events, that occur between the start and end of a process. End events 125 represent a concluding result of completing the process. End events 125 may also be known as Throw Events because they may send or "throw" the concluding result to another entity, process, or system.

Activities and tasks 124 may represent work that is to be performed by an entity or process. Sequence flows 122 may represent a chronological order in that steps of a process are executed. Message flows 131 may show the types of messages that may be exchanged between different business processes, that may, in some instances, be exchanged between different organizations, systems, or entities. Finally, data objects 132 may identify a local state of a business process.

While business process models, including BPMN-compliant models, may be used by business users to intuitively model business processes, application code may not be directly generated from these business process models. Furthermore, organizations with multiple systems from different vendors that expect interactivity between the systems may not be able to simply convert business process models to application code. Thus, the practicality of business process models has been limited to intuitive visualizations of business processes.

There is a need for converting business process models to programming and component models better suited for application delivery that conform with the principles of a technologically agnostic service-oriented architecture to support connectivity between different systems.

BRIEF DESCRIPTION OF THE DRAWINGS

FIGS. 3A and 3B show exemplary lookup tables in embodiments of the invention.

DETAILED DESCRIPTION

In embodiments of the invention, process artifacts and elements in a business process model, such as a Business Process Modeling Notation (BPMN) compliant model, may be analyzed, converted into programming or component model building blocks for developing applications, and enriched with technical metadata. The programming model building blocks may be Service Component Architecture (SCA) Assembly Model building blocks, which may be used to configure runtime services in a Service Oriented Architecture (SOA) such as an Enterprise Service Bus (ESB) or a messaging middleware to enable messaging functionality between systems. The building blocks may be structured in an output file, which may be a Simple Capabilities Description Language (SCDL) file, according to the Service Component Architecture (SCA) Assembly Model based on an order provided in the business process model. Business process model elements may be mapped to corresponding programming model building blocks, such as SCA artifacts, composites, or components, through a lookup table.

In some instances, an entire business process project model may be mapped to one or more programming model files or contributions that contain implementations, interfaces and other artifacts necessary to execute functionality provided in the business process model. Some of the collaboration model entities in a BPMN-compliant model may map to one or more composites in a programming model with its own output (SCDL) file. Other model entities, such as annotations, may not map to any components in the programming model.

Composites may include, for example, entities provided by a SCA assembly model, such as components, services, references, property declarations, and wires or wiring that describes the connections between these elements. Composites may be used to group and link components built from different implementation technologies, allowing appropriate technologies from different systems to be used for each business task.

Each programming model composite may include one or more components. The components may provide business functions that may be offered as a service to other components. Some components may also include a reference indicating a dependency on a service provided by another component. Wires may be use to represent linkages between references and services.

Figure 1:
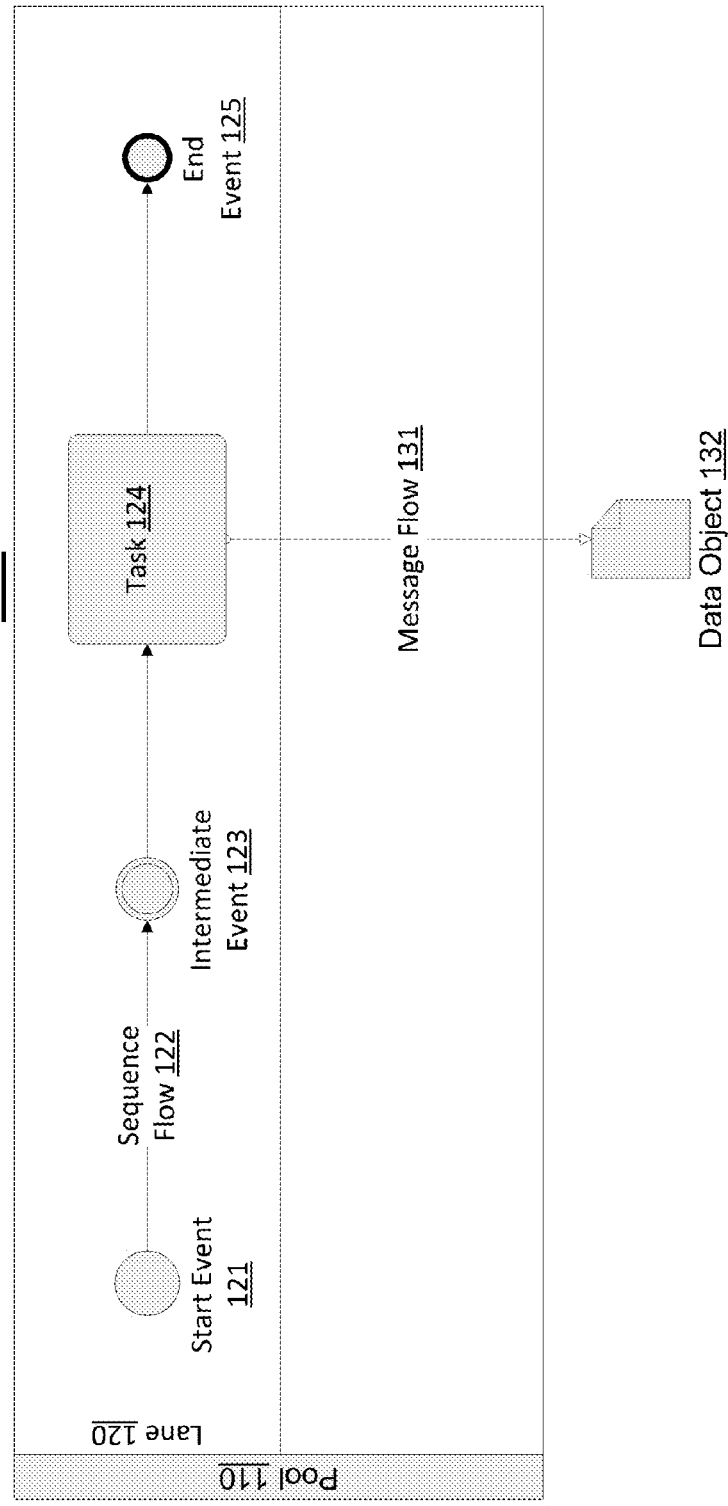
FIG. 1 shows an exemplary BPMN-compliant business process model.
Figure 2:
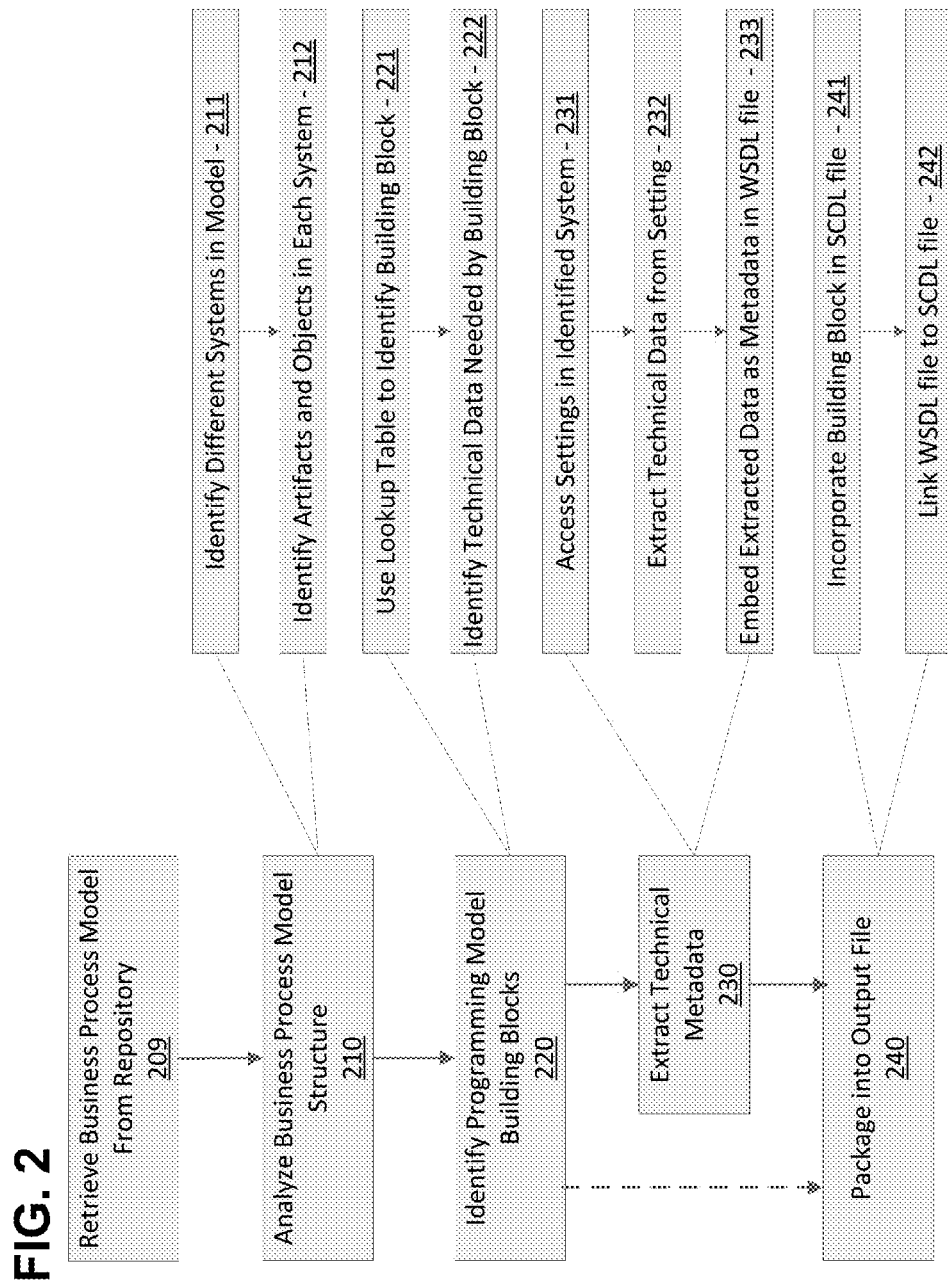
FIG. 2 shows an exemplary process in an embodiment of the invention.

FIG. 2 shows an exemplary process in an embodiment of the invention. In box 209, a business process model, which may include a BPMN-compliant model in some embodiments, may be retrieved from a repository. The model may be retrieved after the model is selected in response to one or more selection criteria, which may include a model identifier, content, or property. In box 210, the business process model may be structurally analyzed to identify different systems and entities shown in the model. In box 211, different systems and entities may be identified by examining different pools 110 and other elements of the business process model indicating the involvement of different entities or systems. Pools 110 may be examined because each pool 110 may represent a different entity involved in a process shown in a business process model.

Once the different entities and systems have been identified, in box 212 the artifacts and objects associated with each identified entity and system may be examined. For example, since each pool 110 represents a different entity, the artifacts and objects in each pool 110 may be examined and associated with the respective entity or system of the pool 110.

In box 220, application-building programming model elements, such as elements from a SCA-compliant Assembly Model, that may be associated with the artifacts and/or objects in each system may be identified. In box 221, a lookup table may be used to identify programming model elements associated with each BPMN object or artifact in the BPMN model. An exemplary lookup table is shown in FIG. 3.

In some instances, either application-building programming model elements or the programming model itself may require additional technical data that may not be included in the business process model. For example, the programming model may seek additional identifying information about other systems sending or receiving process related data, such as domain name, IP address, or protocol information. The programming model may also seek additional information about data objects, services, or communications, such as its type (stateless, RESTful, Message Exchange Pattern (MEP), and so on). In box 222, additional information that is used in the programming model but is not included in the business process model may be identified for subsequent retrieval from another source. This additional information may include information about the information technology landscape in the organization into which the process model may be deployed. Information from the information technology landscape may be used to configure the runtime services in the service oriented architecture (SOA) to ensure compatibility with the other systems interacting with the process model.

If this additional technology landscape information may be obtained from other sources or systems, then in box 230, the additional information may be extracted from the other sources, which may include other systems interacting with the business process model. If, however, the additional technical information is not readily obtainable from other sources or systems, then box 230 and associated boxes 231 to 233, may be bypassed in their entireties. In box 231, configuration settings of one or more systems in the business process model may be accessed to obtain the additional information used in the programming model. In box 232, the technical information identified in box 222 may be extracted from the configuration settings. For example, if the programming model requires an IP address, but the business process model only includes system identifier, then the IP address of the system associated with the system identifier in the business process model may be extracted from the configuration settings, and so on. In box 233, the extracted configuration setting information may be embedded as metadata in a WSDL file for some web services based interactions, or in other formats compatible with other types of interactions.

In box 240, the identified programming model element may be packaged into an output file, which may be a SCDL file. The output file may include the identified programming element. In some embodiments, the extracted configuration setting information may be used to format the output file to facilitate connectivity through particular protocols or frameworks, though in other embodiments, the output file may be created independent of the extracted configuration information, which may be only embedded as metadata in a separate WSDL file and not used during design time to format the output file.

In box 241, the identified programming element may be incorporated as part of the created output file. This incorporation may involve including the programming element in the output file along with other information in business process model, such as attribute or property information. Additional information used in the programming model but not included in the business process model may be obtained from configuration settings of the systems included in the business process model. These configuration settings may be extracted and included as metadata in a separate WSDL file. The configuration settings may also be included directly in the output file as additional parameters or attributes of the programming elements. The configuration settings may also be included indirectly in the output file by formatting the programming elements according to the configuration settings.

FIGS. 3A and 3B shows exemplary tables mapping elements and functionality associated with a business process model to corresponding elements and functionality found in a programming model for building applications. Although the tables include specific elements, artifacts, and building blocks associated with both BPMN and SCA models, the elements included in the table may be representative of the functionality provided by BPMN and SCA specifications and may not be specifically limited to the actual elements defined in current versions of the respective BPMN and SCA specifications. In other words, the mapping tables 300, 330 may map the functionality provided by each element so that the tables may be used to convert elements from other models having different names but providing similar functionality. Thus, while the mapping tables 300, 330 may specifically refer to BPMN and SCA elements, artifacts, and functionality, the mapping tables 300, 330 may be equally used with other models, including future BPMN and SCA models that may provide similar functionality. Accordingly, references in the subsequent text to specific elements in either the BPMN or SCA models refer to the functionality provided by the elements in those models and not the elements in and of themselves.

For example, functionality provided by a BPMN project element 310 may map to functionality provided a SCA contribution element 302, so that the contribution element functionality may be incorporated in an output file, such as a SCDL file, when converting BPMN models to application models. Functionality associated with a BPMN collaboration element 303 may map to functionality provided by a SCA composite element 304. Similarly, a BPMN pool element 305 functionality may map to a SCA component element 306 functionality. Pool element functionality included in a business process model may include Catch Event functionality 307 and Throw Event functionality 309. Catch Event functionality 307 may map to SCA Service functionality 308 and Throw Event functionality 309 may map to SCA Reference functionality 310.

Functionality provided by a BPMN Event Definition 311 subtype may map to binding and implementation type functionality 312 of a SCA element. Data in the Event Definition 311 subtype may be accessed to identify a binding and implementation type 312 used by other systems. Binding types may include SOAP/Web Services, email/MIME, JMS, RFC, EJB/POJO, SDO/JAXB, and so on. Implementation type may include an identifier of the other system or application, such as an Enterprise Resource Planning (ERP) system, Customer Relationship Management (CRM) system, Business Process Management (BPM) Suite, and so on. The implementation type and binding may be accessed to ensure proper encoding and decoding of communications between the systems.

In some embodiments where the Event Definition 311 subtype is not completed or used, the binding, implementation type, and other technical information may be extracted from configuration settings of the other systems and incorporated as metadata in the application or SCA model. The incorporated metadata may be included in the output file, such as a SCDL file, or it may be included as part of a separate file associated with the output file. The separate file may be structured in a web services description language (WSDL).

Start Event and End Event pair functionality 313 may be mapped to a service such as a SCA Service 314, with the service accepting a request document associated with the Start Event and returning a response document associated with the End Event. The service may be a synchronous service in some embodiments. Alternatively, a Start Event may map to an asynchronous service accepting the request document while the End Event may map to an asynchronous reference sending the response document.

Intermediate Event 315 and Boundary Event 317 functionality may be mapped to references, such as SCA References 316, 318 that send events such as messages, signals, instructions, and so on, internally and from other systems. The references may be asynchronous by default.

Functionality representative of a BPMN Activity 319 may also map to a reference, such as SCA Reference 320. The SCA Reference 320 may identify the service to be consumed as part of the BPMN activity 319. Indeed, the SCA Reference 320 may match the service mapped to the process associated with a respective Start Event and End Event functionality 313. Message flow functionality, such as provided by BPMN Message Flow 321 connectors, that denote event exchanges across different BPMN pools 305 may map to wires such as SCA Wires 322. Mapping to wires such as SCA Wires 322 may enable event recipients to be dynamically changed to facilitate different process extensibility scenarios, including Before Process, After Process, and In-Between Process scenarios.

Services may also be reused in different components, including different SCA components. In this situation, some events may be broadcasted and distributed to different processes sharing a same service. On the other hand, references may only be used once to configure a service call in a predetermined system and thus may not be broadcasted.

In mapping table 330 of FIG. 3B, a start of a message sequence, such as a BPMN Message Start Event 331 may map to either a synchronous or asynchronous service, such as SCA Service 332. An endpoint URL or technical binding of the service may be automatically generated during the mapping to the service and may be either included in metadata as part of a WSDL file or as part of the output (SCDL) file. Intermediate messages or tasks that may be received, such as BPMN Message Intermediate Catch Events 333 and Receive Tasks 335, may map to asynchronous services, such as SCA Services 334 and 336 respectively. Components, such as SCA Components may also be generated for Intermediate Catch Event 333 and Receive Task 335 to support message broadcast cases.

An end of a process flow, such as a BPMN Message End Event 337, may map to either an asynchronous reference or synchronous service, such as SCA Reference or Service 338. A start of a message sequence may be linked to an end of a message sequence so that the entire process from start to end may be treated as a synchronous service with the start receiving a request message and the end generating the response message.

Intermediate messages or tasks that may be sent, such as BPMN Message Intermediate Throw Event 339 and Send Task 341, may map to asynchronous references, such as SCA References 340 and 342, respectively. The Message Intermediate Throw Event 339 in the BPMN model may be configured to send a request message to a service that sends back an asynchronous response. In some of these instances, a callback URL and logical interface to the service may be included in the metadata of the WSDL file or as part of the output (SCDL) file.

The invocation of a sub-process or user task, such as BPMN Sub-process 343 or User Task 345, may be mapped to an asynchronous reference, such as SCA Reference 344 or 346, respectively. The completion or cancellation of the sub-process or user task, BPMN Sub-process 343 or User Task 345, may be mapped to an asynchronous service, such as SCA Service 344 or 346. When subflows are invoked as part of a BPMN Sub-process 343, corresponding references may be provided and additional services may be generated to match the corresponding references. These references and services may be included in the output (SCDL) file and may also have property or other information included the metadata of the WSDL file. Additional services may also be generated depending on the properties of a user task, such as User Task 345 in the BPMN model.

A service task, such as BPMN Service Task 347 may map to a synchronous reference, such as SCA Reference 348. A process, such as BPMN Process 349, may map to a configured instance of an implementation, such as a piece of program code providing business functions, which may include SCA Component 350. Collaborations between entities to complete a business process, such BPMN Collaborations 351, may map to composites, such as SCA Composites 352, that may contain the components, services, references, property declarations, and the wiring that describes the connections between these elements. The component and composite values may be derived or copied from the values associated with the respective processes and collaborations.

Figure 4:
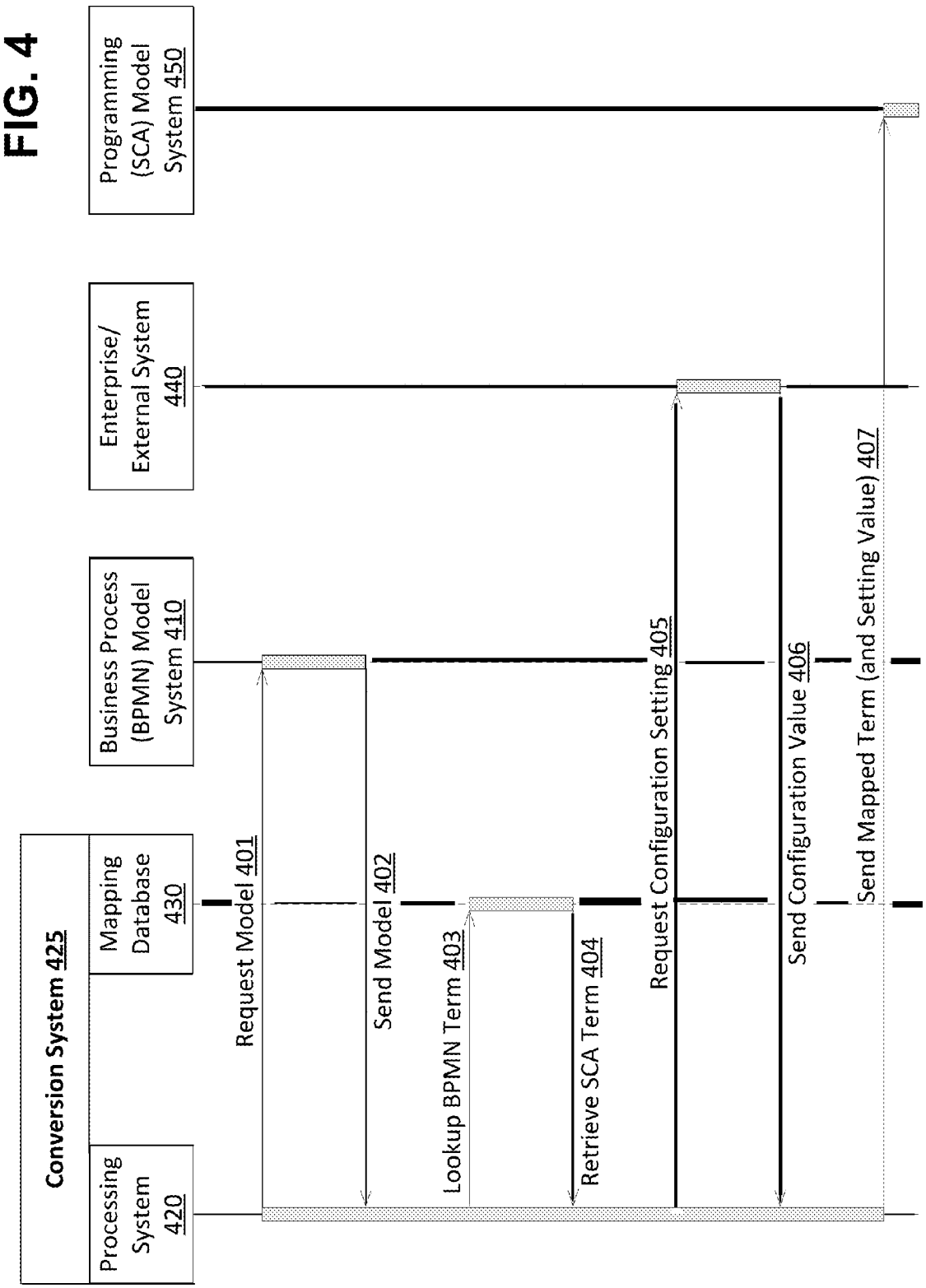
FIG. 4 shows an exemplary data flow between systems in an embodiment of the invention.

FIG. 4 shows an exemplary flow of data between systems in an embodiment of the invention. An embodiment may include a business process modeling system, such as BPMN model repository system 410 to process and store business process models, a conversion system 425 to convert business process models to a programming model for building applications, an enterprise or external system 440 to store configuration settings for systems involved in business process functions included in a business process model, and an application server system, such as SCA programming model system 450 to store and process the programming model output generated by the conversion system 425, which may be SCA-compliant.

The conversion system 425 may include a processing system 420 with a processing device to perform processing operations related to the conversion and a mapping database 430 including, for example, the lookup tables from FIGS. 3A and 3B, which may contain information to convert business process models to programming models for developing applications.

In an embodiment, the processing system 420 may send a request 401 and a business process model identifier to the BPMN model system 410 to select a business process model for conversion. The BPMN model system may retrieve the artifacts, objects, and other elements of the identified business process model and send 402 the retrieved elements to the processing system 420.

The processing system may lookup 403 one or more of the retrieved business process elements in the mapping database 430 and retrieve 404 the mapped programming model element from the database 430. If the information needed to supply the properties and/or attributes of the mapped programming element cannot be obtained from the business process model information sent 402 by the BPMN model system 410, then the processing system 420 may send a request 405 for the missing property/attribute information to the relevant enterprise system 440. The request 405 may identify a specific configuration setting property, attribute, or value that is needed by the mapped programming element. The enterprise system 440 may process the request, search the configurations settings for the requested property, attribute, or value, and send 406 the requested information to the processing system 420.

Each of the configuration setting values 406 received from the enterprise systems 440 and/or attributes and properties of programming elements obtained from the business process model may be stored as metadata. In some embodiments, the processing system 420 may send 407 the mapped programming elements together with the property/attribute metadata to the SCA model system 450. The SCA model system 450 may then package the programming elements into an output file that may be in SCDL. In some instances, the property/attribute metadata may also be packaged into the output/SCDL file, though in other instances, the property/attribute metadata may be included in a separate WSDL file linked to the output/SCDL file. In some instances, the processing system 420 may package the programming elements and/or metadata into SCDL files and/or WSDL files and send the results to the SCA model system for storage or further processing.

Figure 5:
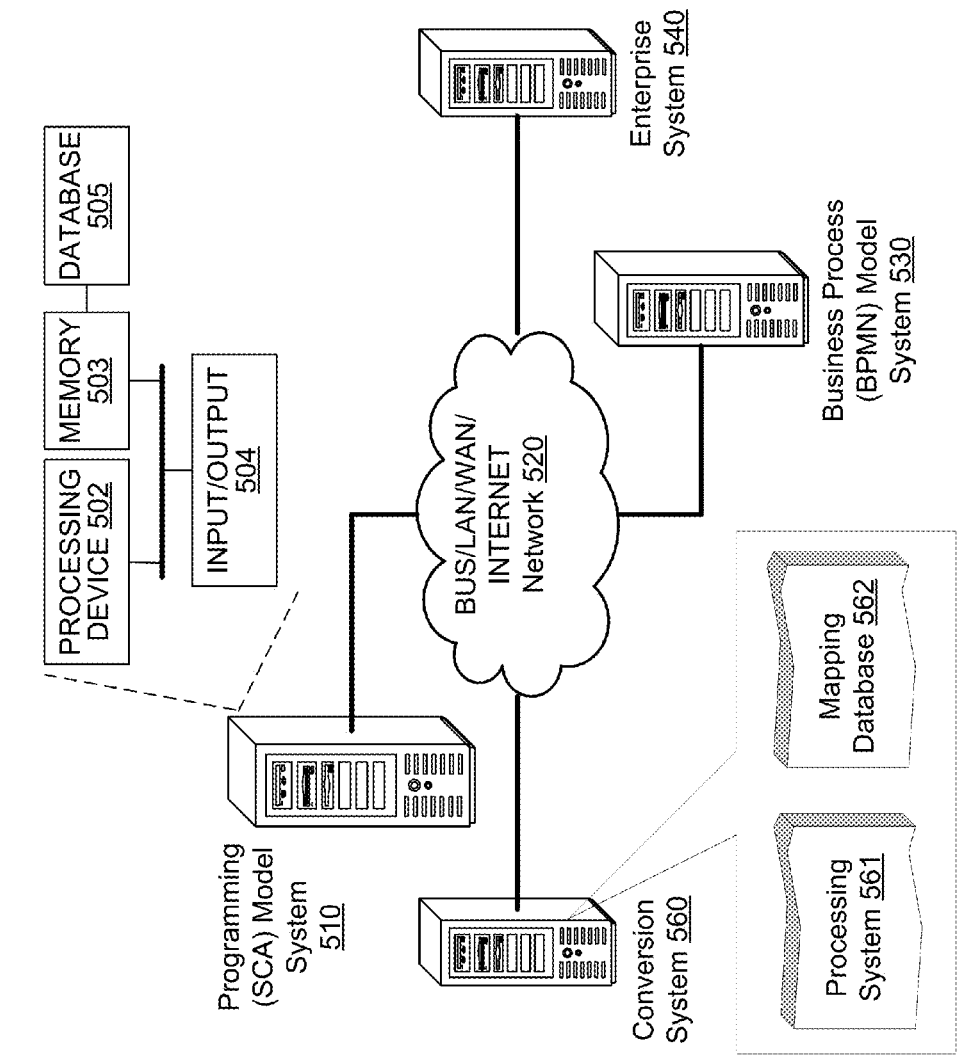
FIG. 5 shows an exemplary configuration of systems in an embodiment of the invention.

FIG. 5 shows an embodiment of a conversion system 560 coupled to a SCA model system 510, BPMN model system 530, and enterprise/external/third party system 540 through a bus or network 520. In an embodiment, the conversion system 560 may include two or more system components, including processing system 561 and mapping database 562. Each of these components may be on separate, independent computing systems forming a conversion system 560, or the components 561, 562 may be consolidated or integrated into a single conversion system 560.

The enterprise/external/third party system 540 may be connected to a firewall system (not shown), if needed, to prevent direct access to other systems of an organization including the SCA model system 510, conversion system 560, and BPMN system 530.

Each of the systems in FIG. 5 may contain a processing device 502, memory 503 containing a database 505, and an input/output interface 504, all of which may be interconnected via a system bus. In various embodiments, each of the systems 510, 530, 540, 560, 561, and 562 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may comprise a single integrated circuit, such as a microprocessing device, or may comprise any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A method comprising:
    identifying different systems in a plurality of pools in a Business Process Modeling Notation (BPMN) compliant business process model;
    associating objects in each of the pools with a respective identified system in the respective pool;
    identifying an application building programming model element building block from a service oriented architecture (SOA) application development component model associated with at least one of the objects;
    responsive to the application development component model seeking a system identifier of the building block, extracting the system identifier of the respective system associated with the respective object and the building block from the business process model;
    obtaining configuration information of the respective system from a configuration setting stored in an external enterprise system;
    embedding the identified building block in an application development component model compliant file; and associating the extracted system identifier and the obtained configuration information with the embedded building block.

2. The method of claim 1, wherein the application development component model is a Service Component Architecture (SCA) Assembly Model.

3. The method of claim 1, wherein the building block is identified through a lookup table mapping business process model elements to corresponding component model building blocks.

4. The method of claim 1, wherein the extracted system identifier and the obtained configuration information are included as metadata in a web services definition language (WSDL) file and linked to the building block in the application development component model compliant file as part of the association.

5. The method of claim 4, wherein the application development component model compliant file is in a Web Services Definition Language (WSDL).

6. The method of claim 1, wherein the extracted system identifier and the obtained configuration information are included as metadata in the application development component model compliant file.

7. The method of claim 1, wherein a service building block representing a business function is identified as corresponding to business process elements that receive a message or task.

8. The method of claim 1, wherein a reference building block representing a dependency on a service provided by another building block is identified as corresponding to business process elements that send a message or task.

9. The method of claim 1, wherein a SCA Wire building block is identified as corresponding to a BPMN Message Flow element.

10. The method of claim 1, wherein a SCA Binding/Implementation type building block is identified as corresponding to a BPMN Event Definition element.

11. The method of claim 1, wherein a SCA Component building block is identified as corresponding to a BPMN Pool or a BPMN Process element.

12. The method of claim 1, wherein a SCA Composite building block is identified as corresponding to a BPMN Collaboration element.

13. The method of claim 1, wherein a SCA Contribution building block is identified as corresponding to a BPMN Project element.

14. The method of claim 1, wherein the first and second properties includes an attribute of the building block.

15. A conversion system comprising a processing device and an interface coupled to a business process model system and a service oriented architecture (SOA) component model system for application development wherein the processing device:

identifies different systems in a plurality of pools in a Business Process Modeling Notation (BPMN) compliant business process model;

associates objects in each of the pools with a respective identified system in the respective pool;

identifies a plurality of application building programming model element building blocks associated with at least one of the objects in a component model of the component model system;

extracts a system identifier of the respective system associated with a respective one of the objects and building blocks from the business process model;

obtains configuration information of the respective system from a configuration setting stored in an external enterprise system;

embeds the identified building blocks in an application development component model compliant file with the extracted system identifier and the obtained configuration information; and sends the structured building blocks to the component model system through the interface.

16. The conversion system of claim 15, wherein the component model is Service Component Architecture (SCA) Assembly Model compliant and the business process model is a Business Process Modeling Notation (BPMN) compliant.

17. The conversion system of claim 15, wherein the plurality of building blocks are identified through a data structure mapping the business process elements to the building blocks.

18. The conversion system of claim 15, wherein the processing device includes the configuration information as metadata in a web services definition language (WSDL) file.

19. A non-transitory computer readable memory comprising instructions that, when executed by a processing device, cause the processing device to:

identify different systems in a plurality of pools in a Business Process Modeling Notation (BPMN) compliant business process model;

associate objects in each of the pools with a respective identified system in the respective pool;

identify a plurality of application building programming model element building blocks associated with at least one of the objects in a service oriented architecture (SOA) component model of a component model system;

extract a system identifier of the respective system associated with a respective one of the objects and building blocks from the business process model;

obtain configuration information of the respective system from a configuration setting stored in an external enterprise system;

embed the identified building blocks in an application development component model compliant file with the extracted system identifier and the obtained configuration information; and send the structured building blocks to the component model system.

* * * * *